United States Patent [19]

Correa

[11] Patent Number: 5,192,516
[45] Date of Patent: Mar. 9, 1993

US005192516A

[54] METHOD FOR LOW NITROGEN OXIDE COMBUSTION IN SUPERSONIC TRANSPORTS

[75] Inventor: Sanjay M. Correa, Schenectady, N.Y.

[73] Assignee: General Electric Company, Schenectady, N.Y.

[21] Appl. No.: 764,869

[22] Filed: Sep. 24, 1991

[51] Int. Cl.$^5$ .............................................. C01B 21/00
[52] U.S. Cl. ................................................... 423/235
[58] Field of Search ................... 423/235, 235 D, 239, 423/239 A

[56] References Cited

U.S. PATENT DOCUMENTS 3,846,981  11/1974  Paczkowski ......................... 423/235
4,761,270   8/1988  Turchan .............................. 423/235

Primary Examiner—Gregory A. Heller
Attorney, Agent, or Firm—Patrick R. Scanlon; Paul R. Webb, II

[57] ABSTRACT

A method for reducing the $NO_x$ produced by the engine of a supersonic aircraft. A reducing agent is injected into the combustor or the exhaust region of the engine. The reducing agent can be either hydrogen azide or hydrazine in an aqeuous form. For injection into the combustor, injection will be perpendicular to the main air flow through the engine and into a downstream portion of the combustor. Injection is carried out whenever $NO_x$ reduction is needed. By injecting the reducing agent into the downstream portion of the combustor or into the exhaust region, the reduction reaction is decoupled from the combustion process so that engine performance is not impaired.

9 Claims, No Drawings

METHOD FOR LOW NITROGEN OXIDE COMBUSTION IN SUPERSONIC TRANSPORTS

BACKGROUND OF THE INVENTION

This invention relates generally to a method for reducing nitrogen oxides ($NO_x$) produced during combustion in the engines of supersonic aircraft and more particularly concerns a method involving the injection of a reducing agent into the exhaust or the combustor of supersonic aircraft engines.

A new generation of supersonic transport, referred to as high speed civil transport (HSCT), is currently under development. As now envisioned, HSCT will be capable of cruising at approximately 2.5 Mach, have transpacific range and carry approximately 300 passengers. Obstacles to the introduction of such large supersonic aircraft include the production of stratospheric nitrogen oxides ($NO_x$), sonic boom and excessive noise. Nitrogen oxides have a lasting deleterious effect on the environment, unlike the sonic boom and noise which are temporary. The presence of $NO_x$ creates a number of environmental problems, not the least of which being the destruction of ozone in the stratosphere, thereby depleting the natural shield against solar ultraviolet radiation. Consequently, there is a great need to reduce the amount of $NO_x$ produced by HSCT.

Due to their high cruising speeds, the HSCT engines will operate at combustor inlet temperatures significantly higher than subsonic aircraft. The high temperature levels are in part due to ram compression of high speed air entering the engines. The ensuing high combustion temperature leads to copious production of $NO_x$ by the thermal mechanism. According to well-supported combustion theory, $NO_x$ produced by the thermal mechanism is due to reactions between atmospheric nitrogen and the free radicals which accompany the combustion process. Thermal $NO_x$ production becomes significant at temperatures above about 3000° F. Since takeoff and cruise performance must not be impaired, attempts (such as lean premixed, prevaporized combustion) to reduce the combustion temperature to a level below which thermal $NO_x$ production occurs are not seen as an assured solution to the $NO_x$ problem. Thus, it is believed that the best approach to minimizing $NO_x$ production recognizes that $NO_x$ will be produced in the combustion process and must later be reduced.

SUMMARY OF THE INVENTION

Accordingly, it is an object of the present invention to reduce $NO_x$ production in supersonic transport aircraft by injecting a reducing agent into the combustor or exhaust of the engine.

More specifically, it is an object of the present invention to provide an aircraft engine having an emission index of less than three grams of $NO_x$ per kilogram of fuel.

In addition, it is an object of the present invention to reduce $NO_x$ production without impairing takeoff or cruise performance.

These and other objects are accomplished in the present invention by providing a method for reducing the $NO_x$ production in a jet engine having a combustor and an exhaust region comprising injecting a chemical reducing agent into the exhaust region or a portion of the combustor downstream of the combustion process. For injection into the combustor, injection will be perpendicular to the main air flow through the engine. The reducing agent can be either hydrogen azide or hydrazine in an aqueous form. Typically, injection of 0.01–0.05 percent of the air flow will be required; the injection is carried out whenever $NO_x$ reduction is needed. Since injection is downstream of the combustion process, engine performance is not compromised.

Other objects and advantages of the present invention will become apparent upon reading the following detailed description and the appended claims.

DETAILED DESCRIPTION OF THE INVENTION

The present invention is a method for reducing the $NO_x$ production in a supersonic transport engine without impairing takeoff or cruise performance or propulsion system safety such as blowoff and relight margins. In one embodiment of the invention, a chemical reducing agent is sprayed or injected into the exhaust region of the aircraft engine. The reducing agent reacts with the products of combustion in the exhaust region to destroy $NO_x$. Thus, it is important that the reducing agent be thoroughly mixed with the products of combustion to ensure sufficient $NO_x$ reduction. To obtain such mixing, the reducing agent can be sprayed using hardware similar to afterburner spraybars. Thus, the engine need not be modified from the configuration that provides optimal takeoff and cruise performance and flame stability margin.

Thermal $NO_x$ is particularly a problem at the high altitudes of supersonic cruise conditions because there are no other sources of $NO_x$ (such as automobiles or power plants) at altitudes. However, $NO_x$ produced by the engine during takeoff can also be a problem. Therefore, there is a need to provide $NO_x$ reduction for many performance conditions. In the method of the present invention, the reducing agent is sprayed whenever $NO_x$ emissions are more than desired. By spraying the reducing agent into the exhaust region, which is downstream of the primary flame zone, the reduction reaction is decoupled from the combustion process. Thus, operation of the engine is not impaired by the injection of the reducing agent.

The preferred reducing agents are either hydrazine ($N_2H_4$) in an aqueous form ($N_2H_4 \cdot H_2O$) or hydrogen azide ($HN_3$). The amount of hydrazine or hydrogen azide depends on the initial amount of $NO_x$ created and the degree of reduction desired. Typically, injection of amounts equal to 0.01–0.05 percent of the total air flow will be required.

Hydrazine and $NO_x$ are a hypergolic combination. A hypergolic combination means that the two components ignite upon contact without an ignition source. Hydrazine in combination with various $NO_x$ species, such as $HNO_3$ and unsymmetrical dimethyl hydrazine (UDMH), form a rocket propellant. The flame temperatures are on the order of 3700K. Hydrazine works to reduce $NO_x$ because of the very rapid hypergolic reaction therebetween forming nitrogen and steam. This reaction is faster than the reactions which produce $NO_x$ from the hydrazine itself, resulting in a net reduction of $NO_x$. Hydrogen azide, which is very thermally unstable, also produces an extremely rapid reaction with $NO_x$, thereby reducing $NO_x$. Hydrogen azide is an attractive reducing agent because its hydrogen to nitrogen ratio ($HN_3$; H:N = $\frac{1}{3}$) is lower than hydrazine ($N_2H_4$; H:N = 2) and ammonia ($NH_3$; H:N = 3). Ammonia is commonly used in catalytically-assisted $NO_x$ reduction processes practiced in stationary power plants and involving passage of the exhaust through a catalyst bed. However, ammonia would not be effective in reducing $NO_x$ in HSCT because it oxidizes to $NO_x$ at the high temperatures associated with supersonic transport combustion.

In a second embodiment, the chemical reducing agent, either hydrazine in an aqueous form or hydrogen azide, is sprayed or injected into the combustor of the supersonic transport engine. The combustor will be modified to install spray hardware downstream of the primary fueling stations. The spray hardware will be arranged so that the reducing agent will be injected perpendicular to primary direction of the main flow of air through the combustor to ensure thorough mixing. Also, the reducing agent will be injected into the downstream portion of the combustor where the temperatures are more favorable to the $deNO_x$ reaction. As with the first embodiment, the reducing agent is injected whenever $NO_x$ reduction is needed and injection of amounts equal to 0.01–0.05 percent of the total air flow will be required. By injecting the reducing agent into the downstream portion of the combustor, the reduction reaction is decoupled from the combustion process so that engine operation is not compromised.

The foregoing has described a method for reducing the $NO_x$ production in a supersonic transport engine without impairing takeoff or cruise performance.

While specific embodiments of the present invention have been described, it will be apparent to those skilled in the art that various modifications thereto can be made without departing from the spirit and scope of the invention as defined in the appended claims.

What is claimed is:

1. A method of reducing the amount of nitrogen oxides produced by combustion in a jet engine of a supersonic aircraft having a combustor, said method comprising injecting a reducing agent into a downstream portion of the combustor of the jet engine perpendicularly to the primary direction of airflow through the combustor.

2. The method of claim 1 wherein said reducing agent is hydrazine in an aqueous form.

3. The method of claim 1 wherein said reducing agent is hydrogen azide.

4. The method of claim 1 wherein the amount of said reducing agent injected into the combustor is equal to 0.01 to 0.05 percent of the air flow through the engine.

5. A method of reducing the amount of nitrogen oxides produced by combustion in a jet engine of a supersonic aircraft having an exhaust region, said method comprising injecting hydrogen azide into the exhaust region of the jet engine.

6. The method of claim 5 wherein the amount of said reducing agent injected into the exhaust region is equal to 0.01 to 0.05 percent of the air flow through the engine.

7. A method of reducing the amount of nitrogen oxides produced by combustion in a jet engine of a supersonic aircraft having a combustor, said method comprising injecting hydrogen azide into the combustor of the jet engine.

8. The method of claim 7 wherein said hydrogen azide is injected perpendicular to the primary direction of airflow through the combustor and into a downstream portion of the combustor.

9. The method of claim 1 wherein the amount of said hydrogen azide injected into the combustor is equal to 0.01 to 0.05 percent of the air flow through the engine.

* * * * *